(12) United States Patent
Joo et al.

(10) Patent No.: US 12,728,356 B2
(45) Date of Patent: Sep. 8, 2026

(54) LEARNING SYSTEM AND METHOD FOR AUTOMATIC OBSERVING SERVICE

(71) Applicant: GWANGJU INSTITUTE OF SCIENCE AND TECHNOLOGY, Gwangju (KR)

(72) Inventors: Ho-Taek Joo, Gwangju (KR); Sung-Ha Lee, Gwangju (KR); Cheong-mok Bae, Gwangju (KR); Kyung-Joong Kim, Gwangju (KR)

(73) Assignee: GWANGJU INSTITUTE OF SCIENCE AND TECHNOLOGY, Gwangju (KR)

( * ) Notice: Subject to any disclaimer, the term of this patent is extended or adjusted under 35 U.S.C. 154(b) by 353 days.

(21) Appl. No.: 18/515,994

(22) Filed: Nov. 21, 2023

(65) Prior Publication Data

US 2024/0198231 A1 Jun. 20, 2024

(30) Foreign Application Priority Data

Dec. 16, 2022 (KR) ........................ 10-2022-0177052

(51) Int. Cl.
*A63F 13/67* (2014.01)
*A63F 13/52* (2014.01)

(52) U.S. Cl.
CPC .............. *A63F 13/67* (2014.09); *A63F 13/52* (2014.09)

(58) Field of Classification Search
CPC .......... A63F 13/67; A63F 13/52; A63F 13/86; G06N 3/0464
See application file for complete search history.

(56) References Cited

U.S. PATENT DOCUMENTS 10,713,794 B1 7/2020 He et al.
2020/0027019 A1* 1/2020 Yang .................... G06N 3/0985
2020/0364509 A1* 11/2020 Weinzaepfel ............ G06N 3/08

FOREIGN PATENT DOCUMENTS

JP 2022-545128 A 10/2022
KR 10-2018-0022355 A 3/2018
KR 10-2019-0074131 A 6/2019
(Continued)

OTHER PUBLICATIONS

[Supportive Material for Exception to Loss of Novelty] Ho-Taek Joo et al., "Learning to automatically spectate games for Esports using object detection mechanism," Expert Systems With Applications, Jul. 27, 2022, vol. 213 (16 pages).
(Continued)

*Primary Examiner* — Kevin Y Kim
(74) *Attorney, Agent, or Firm* — Hauptman Ham, LLP

(57) ABSTRACT

The present disclosure relates to a learning system and method for an automatic observing service. The learning system for an automatic observing service according to an embodiment of the present disclosure includes: a game data processing portion that generates game input data by abstracting a game screen of a frame configuring a game video file for learning; an observing data processing portion that generates a plurality of masked human data based on observation areas each selected by a plurality of humans on the game screen; and an artificial neural network model that trains to predict an observing viewport, which is an area of human interest among the game screens, based on the game input data and the plurality of masked human data.

12 Claims, 6 Drawing Sheets

(56) References Cited

FOREIGN PATENT DOCUMENTS

| | | | |
|---|---|---|---|
| KR | 10-2021-0034561 | A | 3/2021 |
| KR | 10-2021-0049648 | A | 5/2021 |
| KR | 10-2427205 | B1 | 8/2022 |

OTHER PUBLICATIONS

Office Action dated Dec. 11, 2024 for corresponding Korean Patent Application No. 10-2022-0177052, along with an English machine translation (29 pages).

* cited by examiner

Observation screen

Minimap

LEARNING SYSTEM AND METHOD FOR AUTOMATIC OBSERVING SERVICE

CROSS-REFERENCE TO RELATED APPLICATION

The present application claims the benefit of priority to Korean Patent Application No. 10-2022-0177052, filed on Dec. 16, 2022 in the Korean Intellectual Property Office, the entire content of which is incorporated herein by reference.

TECHNICAL FIELD

The present disclosure relates to a learning system and method for an automatic observing service, and more specifically, to a learning system and method for learning an observation area selected by a plurality of human observers from previously collected game screens, and automatically predicting and servicing an observing viewport on the game screen based on the learned results.

BACKGROUND

As games develop, the content of the game becomes increasingly complex, and the graphic screen of the game moves at a very fast speed. As the gaming population increases, the popularity of e-sports (electronic sports) is increasing day by day. E-sports (electronic sports) is a sport in which the players of a game compete using computers, networks, and other video equipment. In e-sports, a game director (observer) is needed to select and transmit a portion of the observation screen area out of the entire game screen. In other words, the game director performs the same function as a cameraman in general sports broadcasting.

Players participating in e-sports do not look at their opponents' game screens. Accordingly, players only look at their own game screen and proceed with their play while predicting the strategy of the opponent players. A game director may scout the game screens of all players. The game director looks at the game screens of all players and selects important or interesting observation areas on the game screen that may recognize the current situation of each player and the strategies each player is attempting. The observation screen selected by the game director is transmitted to viewers, and the caster and commentator relay the progress of the game based on this observation screen.

Generally, the game director is a human, and the observation area is manually selected by the human. Because the game director needs to have a high level of understanding of the game, the number of professional game directors is insufficient compared to the growth of the e-sports market. For this reason, a game director is assigned to provide observing services for large-scale e-sports matches, but observing services by the game director may not be provided for small-scale tournaments or individual game matches.

In addition, when players play the game quickly and switch game screens quickly, or when the game is played simultaneously at a plurality of points on the game screen, it is difficult for the game director to understand the overall progress of the game. Additionally, as the game progresses for a long time, the game director may make mistakes and miss important game scenes as fatigue accumulates.

In order to address the aforementioned issue, an automatic observing service that automatically selects and services important observation areas on the game screen was proposed. An automatic observing service device automatically extracts important observation areas from the entire game screen based on predefined rules or events and serves the same to viewers.

Since these conventional automatic observing services provide observing services based on rules or events predefined by humans, it is very difficult to define event rules for complex games with various event cases. There is an issue that it is difficult to automatically detect observing viewports where events that are not defined in advance occur.

In general, real-time strategy (RTS) games such as StarCraft have many more in-game objects (buildings, units, and various unit types) than multiplayer online battle arena (MOBA) games. Hence, there are so many different events that may occur in a game that it is very likely that not all events may be defined or that events are defined incorrectly.

RELATED ART DOCUMENTS

Patent Documents

Korean Patent Application Publication No. 10-2018-0022355, Mar. 6, 2018

Korean Patent Application Publication No. 10-2019-0074131, Jun. 27, 2019

SUMMARY

An aspect of the present disclosure is directed to providing a learning system and method for an automatic observing service capable of training patterns of human interest areas based on the observation areas each selected by a plurality of humans on a random game screen, and automatically predicting an observing viewport on the game screen based on the trained observation pattern information.

An embodiment of the present disclosure may be implemented by various methods including a device (system), a method, a computer program stored in a computer readable media, or a computer readable media in which a computer program is stored.

The learning system for an automatic observing service according to an embodiment of the present disclosure includes: a game data processing portion that generates game input data by abstracting a game screen of a frame configuring a game video file for learning; an observing data processing portion that generates a plurality of masked human data based on observation areas each selected by a plurality of humans on the game screen; and an artificial neural network model that trains to predict an observing viewport, which is an area of human interest among the game screens, based on the game input data and the plurality of masked human data.

Preferably, the game data processing portion includes: a game data preprocessor that groups in-game objects configuring the game screen according to a type, divides the same into separate channel screens, and abstracts the in-game objects for each channel; and a game input data generation portion that outputs the game input data configured of at least one channel screen to the artificial neural network model.

Preferably, the observing data processing portion includes a plurality of observation data collection portions, wherein each observation data collection portion collects observation area information selected by the plurality of humans in response to the game input data and outputs the masked human data corresponding to each collected observation area to the artificial neural network model.

More preferably, the masked human data includes masked data corresponding to the observation area, a class type of the masked data, and coordinate information indicating a location of the masked data.

Preferably, the artificial neural network model is implemented with MASK R-CNN.

More preferably, the artificial neural network model learns an observation pattern of an area of human interest among the game screens.

In addition, a system for evaluating a trained artificial neural network model according to an embodiment of the present disclosure includes: a game data processing portion that generates game input data by abstracting a game screen of a frame configuring a game video file for evaluation; an observing data processing portion that collects observation area information each selected by at least one human on the game screen; an artificial neural network model that trains to predict an observing viewport on the game screen by training to predict an area of human interest among the game screens based on a plurality of masked human data derived from game input data for learning and presently collected game input data for learning; and an evaluation portion that evaluates the artificial neural network model trained based on the predicted observing viewport and observation area information each selected by one or more humans.

Preferably, the game data processing portion includes: a game data preprocessor that groups in-game objects configuring the game screen according to a type, divides the same into separate channel screens, and abstracts the in-game objects for each channel; and a game input data generation portion that outputs the game input data configured of at least one channel screen to the trained artificial neural network model.

Preferably, the trained artificial neural network model is implemented with MASK R-CNN.

Preferably, the evaluation portion evaluates the trained artificial neural network model based on a ratio of an area of the predicted observing viewport and an area of an overlapping area where the predicted observing viewport and the observation areas each selected by the one or more humans overlap.

In addition, the learning method for an automatic observing service according to an embodiment of the present disclosure includes: generating game input data by abstracting a game screen of a frame configuring a game video file for learning; generating a plurality of masked human data based on observation areas each selected by a plurality of humans on the game screen; and training an artificial neural network model to predict an observing viewport, which is an area of human interest among the game screens, based on the game input data and the plurality of masked human data.

Preferably, the generating of the game input data by abstracting the game screen of the frame configuring the game video file for learning includes: grouping in-game objects configuring the game screen according to a type, dividing the same into separate channel screens, and abstracting the in-game objects for each channel; and outputting the game input data configured of at least one channel screen to the artificial neural network model.

Preferably, the generating of the plurality of masked human data based on the observation areas each selected by the plurality of humans on the game screen includes: collecting observation area information selected by the plurality of humans in response to the game input data and outputting the masked human data corresponding to each collected observation area to the artificial neural network model.

More preferably, the masked human data includes masked data corresponding to the observation area, a class type of the masked data, and coordinate information indicating a location of the masked data.

Preferably, the artificial neural network model is implemented with MASK R-CNN.

More preferably, the artificial neural network model learns an observation pattern of an area of human interest among the game screens.

A system for providing an automatic observing service according to an embodiment of the present disclosure includes an artificial neural network model trained by the aforementioned learning method for the automatic observing service.

Advantageous Effects

According to an embodiment of the present disclosure, by learning the observation patterns of people from the observation areas each selected by a plurality of people observing a game, the observing viewports that game audiences are expected to be interested in can be automatically predicted and serviced.

According to an embodiment of the present disclosure, since definition of predefined rules or events is not needed, the observing viewports can be automatically predicted and serviced without sufficient knowledge about the game.

According to an embodiment of the present disclosure, observing viewport prediction performance can be improved by evaluating the predicted observing viewport area based on the observation area selected by people.

The benefits of the present disclosure are not limited to those mentioned above, and other benefits not mentioned herein will be clearly understood by those skilled in the technical field to which the present disclosure pertains (hereinafter, "those skilled in the art") from the description of the claims.

BRIEF DESCRIPTION OF THE DRAWINGS

Embodiments of the present disclosure will be described with reference to the accompanying drawings described below, where like reference numerals denote like elements, but are not limited thereto.

FIG. 1A illustrates an observation screen displayed on the audience screen, and FIG. 1B illustrates a mini-map of the entire game screen.

DETAILED DESCRIPTION

Figures 1A, 1B:
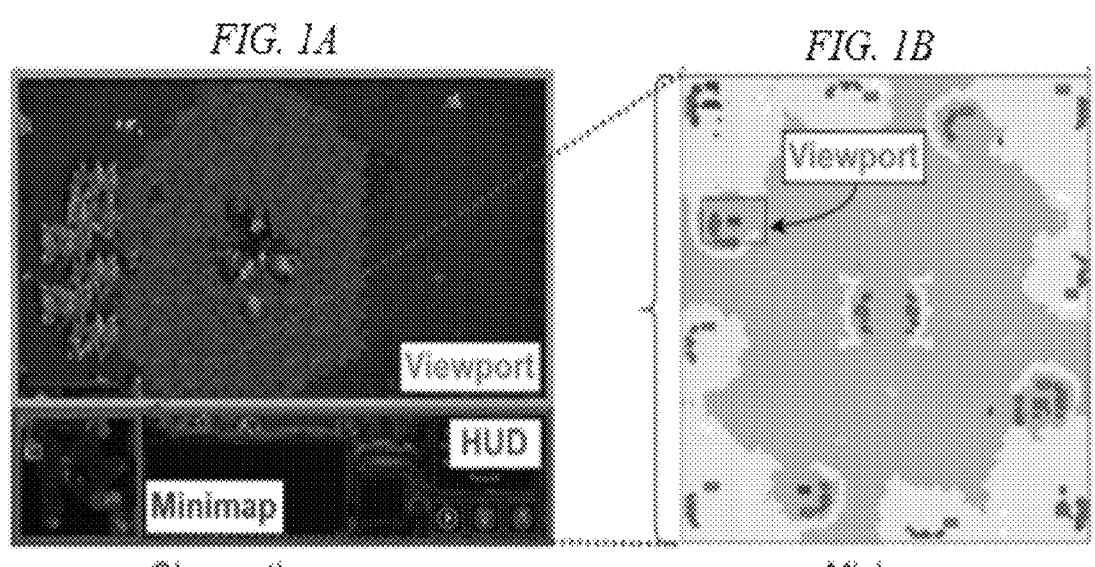
FIGS. 1A and 1B are diagrams illustrating screen information of the StarCraft game, where

Hereinafter, with reference to the accompanying drawings, specific details for carrying out the present disclosure will be described in detail. However, in the following description, when it is determined that a detailed description of widely known functions or configurations may unnecessarily obscure the gist of the present disclosure, the detailed description thereof will be omitted.

In the accompanying drawings, the same or corresponding components are assigned the same reference numerals. In addition, in the description of the following embodiments, redundant descriptions of the same or corresponding components may be omitted. However, even when description of a component is omitted, it is not intended that such component is not included in any embodiment.

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will fully convey the scope of the present disclosure to those skilled in the art.

Unless otherwise defined, all terms (including technical and scientific terms) used herein have the same meanings as commonly understood by those skilled in the technical field to which the present disclosure pertains. It will be further understood that terms, such as those defined in commonly used dictionaries, should not be interpreted in an idealized or overly formal sense unless expressly so defined herein.

The term "techniques," for instance, may refer to system (s), method(s), computer-readable instructions, module(s), algorithms, hardware logic, and/or operation(s) as permitted by the context described above and throughout the document.

The terms used in the present specification will be briefly described, and the present disclosure will be described in detail. Although the terms used in the present disclosure are selected from generally known and used terms while considering functions of the present disclosure, they may vary according to intention or customs of those skilled in the art or emergence of new technology. Some of the terms mentioned in the description of the present disclosure may have been selected by the applicant at his or her discretion, and in such cases the detailed meanings thereof will be described in relevant parts of the description herein. Thus, the terms used in this specification should be interpreted based on the substantial meanings of the terms and the whole content of this specification rather than their simple names or meanings.

The terms in singular form may include plural forms unless otherwise specified. In addition, the terms in plural form may include singular forms unless otherwise specified. Throughout the entire specification, when one part is said to "include (or comprise)" a component, unless specifically mentioned otherwise, instead of excluding any other component, this may signify that the one part may further include other components.

In the present disclosure, terms such as "comprises (includes)", "comprising (including)", etc. may indicate the presence of features, steps, operations, elements and/or components, although such terms do not exclude that one or more other functions, steps, operations, elements, components and/or combinations thereof are further added.

In the present disclosure, when a particular component is referred to as "coupling", "combining", "connecting," "associating" or "reacting" to any other component, the particular component is directly coupled to, combined with, connected to and/or associated with or reacted with other components, without being limited thereto. For example, there may be one or more intermediate components between a particular component and another component. In addition, in the present disclosure, "and/or" may include each of one or more listed items or a combination of at least a portion of one or more items.

In the present disclosure, terms such as "first" and "second" are used to distinguish a particular component from other components, and the aforementioned components are not limited by these terms. For example, a "first" component may be an element of the same or similar type as a "second" component.

Artificial intelligence means the field in which artificial intelligence or methodology capable of producing artificial intelligence is researched. Machine learning means the field in which various problems handled in the artificial intelligence field are defined and methodology for solving the problems are researched. Machine learning is also defined as an algorithm for improving performance of a task through continuous experiences for the task.

An artificial neural network (ANN) is a model used in machine learning, and is configured with artificial neurons (nodes) forming a network through a combination of synapses, and may mean the entire model having a problem-solving ability. The artificial neural network may be defined by a connection pattern between the neurons of different layers, a learning process of updating a learning parameter within a model, and an activation function for generating an output value.

The artificial neural network may include an input layer, an output layer, and optionally one or more hidden layers. Each layer includes one or more neurons. The artificial neural network may include a synapse connecting neurons. In the artificial neural network, each neuron may output a function value of an activation function for input signals, weight for each layer, and a bias input through a synapse.

A learning parameter of a model means a parameter determined through learning, and includes the weight of a synapse connection and the bias of a neuron. Furthermore, a hyper parameter means a parameter that needs to be configured prior to learning in the machine learning algorithm, and includes a learning rate, the number of times of repetitions, a mini-deployment size, and an initialization function.

A purpose of learning of the artificial neural network may be considered to determine a learning parameter that minimizes a loss function. The loss function may be used as an index for determining an optimal learning parameter in the learning process of an artificial neural network.

Machine learning may be classified into supervised learning, unsupervised learning, and reinforcement learning based on a learning method.

Supervised learning means a method of training an artificial neural network in the state in which a label for learning data has been given. The label may mean an answer (or a result value) that must be deduced by an artificial neural network when learning data is input to the artificial neural network. Unsupervised learning may mean a method of training an artificial neural network in the state in which a label for learning data has not been given. Reinforcement learning may mean a learning method in which an agent defined within an environment is trained to select a behavior or behavior sequence that maximizes accumulated compensation in each state.

Machine learning implemented as a deep neural network (DNN) including a plurality of hidden layers, among artificial neural networks, is also called deep learning. Deep learning is part of machine learning. Hereinafter, machine learning is used as a meaning including deep learning. Artificial intelligence may be performed by an artificial neural network module.

FIGS. 1A and 1B are diagrams illustrating screen information of the StarCraft game, where FIG. 1A illustrates an observation screen displayed on the audience screen, and FIG. 1B illustrates a mini-map of the entire game screen. The observation screen includes a viewport area where a portion of the observation image of the entire game screen is displayed, and a head-up display (HUP) area at the bottom of the viewport screen. In the HUP area, there is a minimap that briefly displays the overall game status. The minimap shows abstracted information about the overall game status as illustrated in FIG. 1B. In other words, through the minimap, a game director may see unit movements, battlefield conditions, fog of war, etc. at a glance, and select the area expected to be of most interest to an audience and display the same in the viewport area.

Conventionally, a human observer (game director) selects the observation area displayed in the viewport area among the entire game screen. However, an embodiment of the present disclosure proposes a method in which a computer system automatically selects the observing viewport area among the entire game screen.

To this end, an embodiment of the present disclosure collects the observation areas selected by a plurality of humans on a game screen of an arbitrary frame of a game video and learns the observation patterns of humans.

Figure 2:
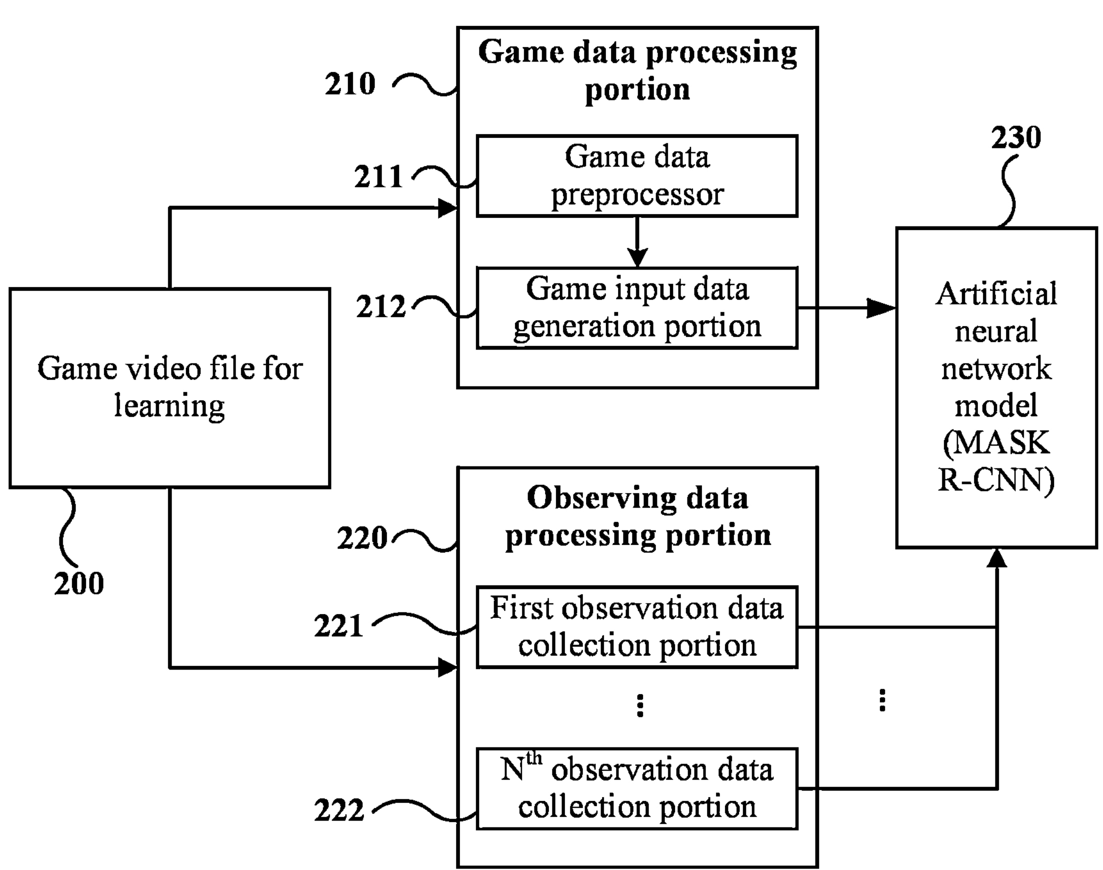
FIG. 2 is a block diagram illustrating a learning system for an automatic observing service according to an embodiment of the present disclosure.

FIG. 2 is a block diagram illustrating a learning system for an automatic observing service according to an embodiment of the present disclosure.

The system includes: a game data processing portion 210 that generates game input data by abstracting a game screen of a frame configuring a game video file 200 for learning; an observing data processing portion 220 that generates a plurality of masked human data based on observation areas each selected by a plurality of humans on the game screen of the frame configuring the game video file 200 for learning; and an artificial neural network model 230 that trains to predict an observing viewport, which is an area of human interest (ROI) among the game screens, based on the game input data and the plurality of masked human data.

The game data processing portion 210 includes: a game data preprocessor 211 that groups in-game objects (units and buildings) configuring the game screen according to a type, divides the same into separate channel screens, and abstracts the in-game objects for each channel; and a game input data generation portion 212 that generates game input data configuring a plurality of channel screens and outputs the same to the artificial neural network model 230.

For game video files, the game screen of each game player may be divided into a separate channel, and the in-game objects configuring the game screen of each game player may be grouped according to preset standards and divided into separate channels. For example, in the case of a 1-on-1 RTS game such as StarCraft, the game screen of each game player is divided into four channel screens (worker unit channel with worker units, ground unit channel with ground units, air unit channel with air units, and building channel connecting buildings). Accordingly, game input data may be configured of four channel screens for each player, for a total of eight channel screens. The number of channel screens configuring the game input data may vary depending on the number of game players and the grouping criteria of in-game objects.

The game video file 200 for learning may be provided to a plurality of humans. It is preferable for the plurality of humans to watch the game video file for learning while selecting an area of interest among the entire game screen of the game video file 200 for learning. To this end, it is preferable that the humans participating in the learning of an embodiment of the present disclosure have a high level of understanding of the game. In other words, the plurality of humans may each select an observation area while watching the game video file 200 for learning.

The observing data processing portion 200 may include a plurality of observation data collection portions 221 and 222. Each observation data collection portion 221 and 222 may observation data selected by a plurality of humans in response to the game input data and output the masked human data corresponding to each observation area.

Figure 3:
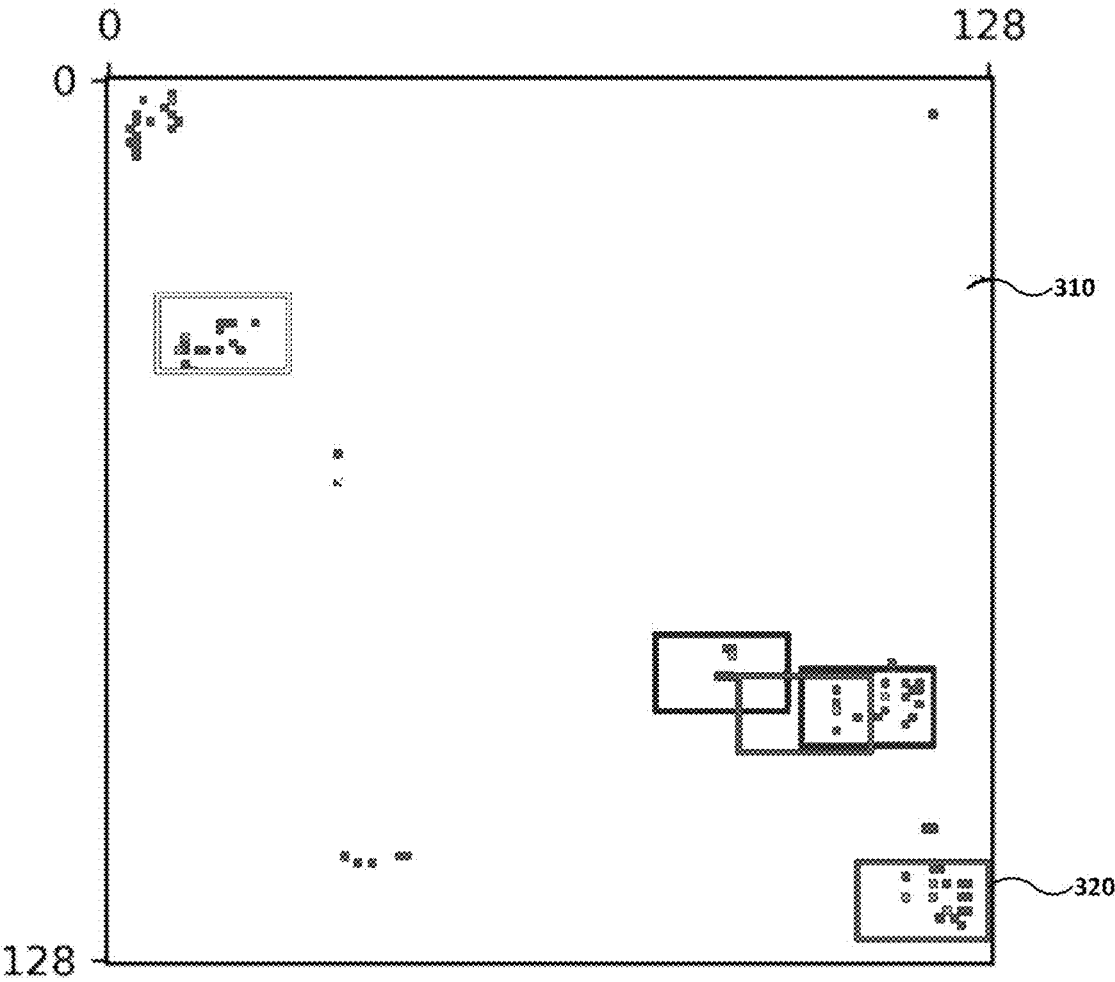
FIG. 3 is a diagram illustrating game input data and an observation area with a map size of 128×128.

FIG. 3 is a diagram illustrating game input data and an observation area with a map size of 128×128. In FIG. 3, 128 represents the map size. In FIG. 3, a background 310 is game input data, and this game input data may include abstracted in-game objects. In FIG. 3, boxes 320 in the foreground are the observation areas. FIG. 3 displays the observation areas each input by five humans. The observation area may be a rectangular area in which game viewers are interested.

Figure 4:
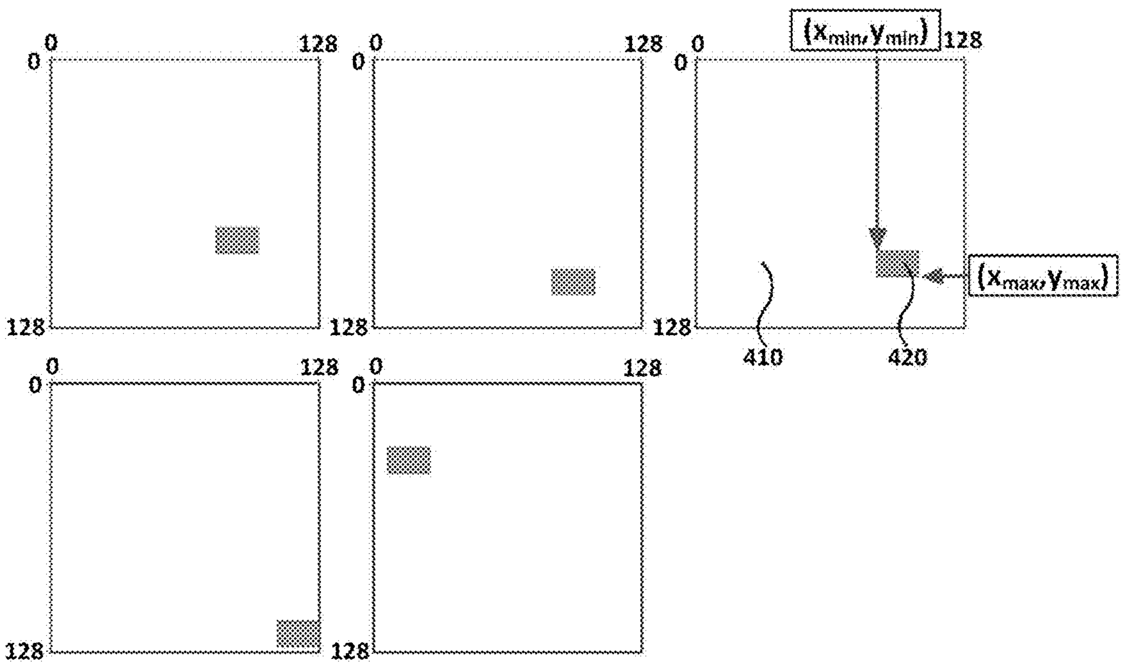
FIG. 4 is a diagram illustrating five pieces of masked human data output from each observation data collection portion of an observing data processing portion.

FIG. 4 is a diagram illustrating five pieces of masked human data output from each observation data collection portion 221 and 222 of the observing data processing portion 220. In FIG. 4, 128 each represents the map size. The masked human data may include information needed to train the artificial neural network model 230. The masked human data may include masked data 420 corresponding to the observation area in an entire map 410, a class type of the masked data 420 (whether it is an area of interest), and coordinate information (($x_{min}$, $y_{min}$) and ($x_{max}$, $y_{max}$)) indicating a location of the masked data 420. In the drawing, the coordinate information is displayed only for the third masked human data from the top, but the present disclosure is not limited to this, and all masked human data may include masked data, class type, and coordinate information.

The artificial neural network model 230 may be implemented with MASK R-CNN. Game input data is input from the game data processing portion 210 and a plurality of masked human data are input from the observing data processing portion 220 to the artificial neural network model 230. The artificial neural network model 230 may learn a plurality of masked human data corresponding to the game input data. When new game input data is input to the trained artificial neural network model, the trained artificial neural network model may predict the observing viewport, which is an area of interest, from the new game input data.

The artificial neural network model 230 may learn game input data and masked human data to learn patterns of areas of interest to humans on the game screen. For example, observation patterns such as the location of in-game objects of each player, the path the unit moves, the number of grouped in-game objects, and the location of each in-game object on the entire map (for example, when a unit of one player is located at a base of an opponent player) may be trained.

Figure 5:
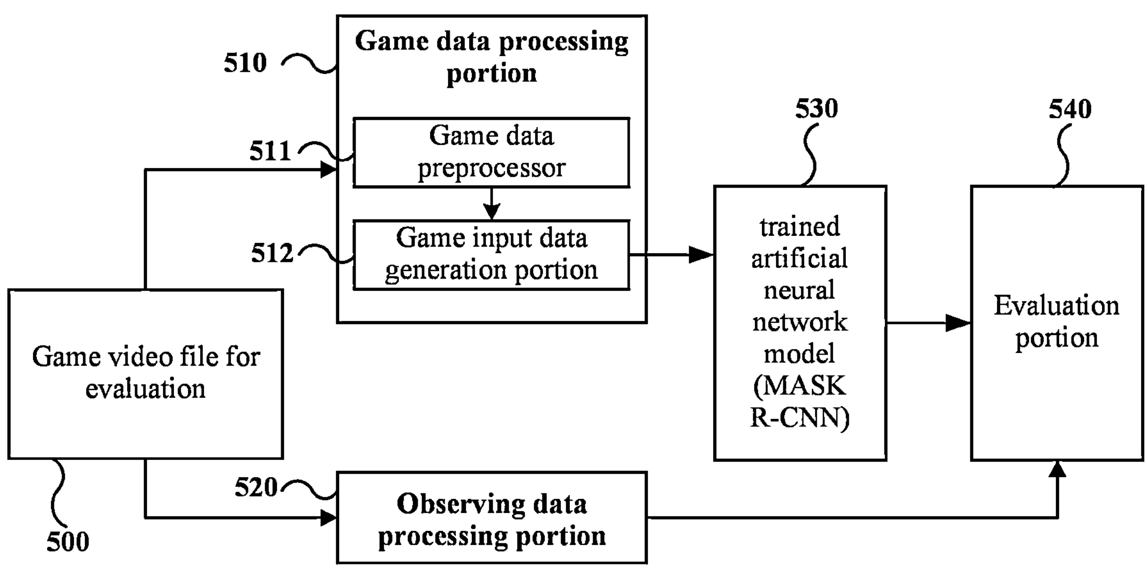
FIG. 5 is a block diagram illustrating a system for evaluating a trained artificial neural network model according to an embodiment of the present disclosure.

FIG. 5 is a block diagram illustrating a system for evaluating a trained artificial neural network model according to an embodiment of the present disclosure.

The system for evaluating the trained artificial neural network model includes: a game data processing portion 510 that outputs game input data by abstracting a game screen of a frame configuring a game video file 500 for evaluation; an observing data processing portion 520 that collects observation data selected by at least one human on the game screen of the frame configuring the game video file 500 for evaluation; an artificial neural network model 530 that trains to predict and output an observing viewport, which is an area of human interest, based on the game input data; and an evaluation portion 540 that evaluates the trained artificial neural network model 530 by comparing the observation data input from the observing data processing portion 520 with the predicted observing viewport input from the trained artificial neural network model 530.

The game data processing portion 510 includes: a game data preprocessor 511 that groups in-game objects (units and buildings) configuring the game screen according to a type, divides the same into separate channel screens, and abstracts the in-game objects for each channel; and a game input data generation portion 512 that outputs game input data configuring a plurality of channel screens.

For game video files, the game screen of each game player may be divided into a separate channel, and the in-game objects configuring the game screen of each game player may be grouped according to preset standards and divided into separate channels. For example, in the case of a 1-on-1 RTS game such as StarCraft, the game screen of each game player is divided into four channel screens (worker unit channel with worker units, ground unit channel with ground units, air unit channel with air units, and building channel connecting buildings). Accordingly, game input data may be configured of four channel screens for each player, for a total of eight channel screens. The number of channel screens configuring the game input data may vary depending on the number of game players and the grouping criteria of in-game objects.

The trained artificial neural network model 530 may receive raw game data from a game video file for evaluation and predict the observing viewport, which is an area of interest, based on the trained observation pattern.

The game video file 500 for evaluation may be provided to at least one human. It is preferable for one or more humans to watch the game video file 500 for evaluation while selecting an area of interest among the entire game screen of the game video file 500 for evaluation. To this end, it is preferable that the humans participating in the evaluation of an embodiment of the present disclosure have a high level of understanding of the game. In other words, at least one human may each select an observation area while watching the game video file 500 for evaluation.

The observing data processing portion 520 collects observation area information from at least one human.

The evaluation portion 540 may evaluate the trained artificial neural network model 530 by comparing the observing viewport predicted by the trained artificial neural network model 530 with at least one human observation area collected by the observing data processing portion 520.

The evaluation portion 540 may evaluate the trained artificial neural network model based on a ratio of an area of the predicted observing viewport for the game screen of any one frame and an area of an overlapping area where the predicted observing viewport and the observation areas of humans overlap. By averaging the evaluation scores of the artificial neural network model trained for a plurality of frames of the game video file 500 for evaluation, the performance of the artificial neural network model 530 trained for the game video file 500 for evaluation may be evaluated.

Figure 6:
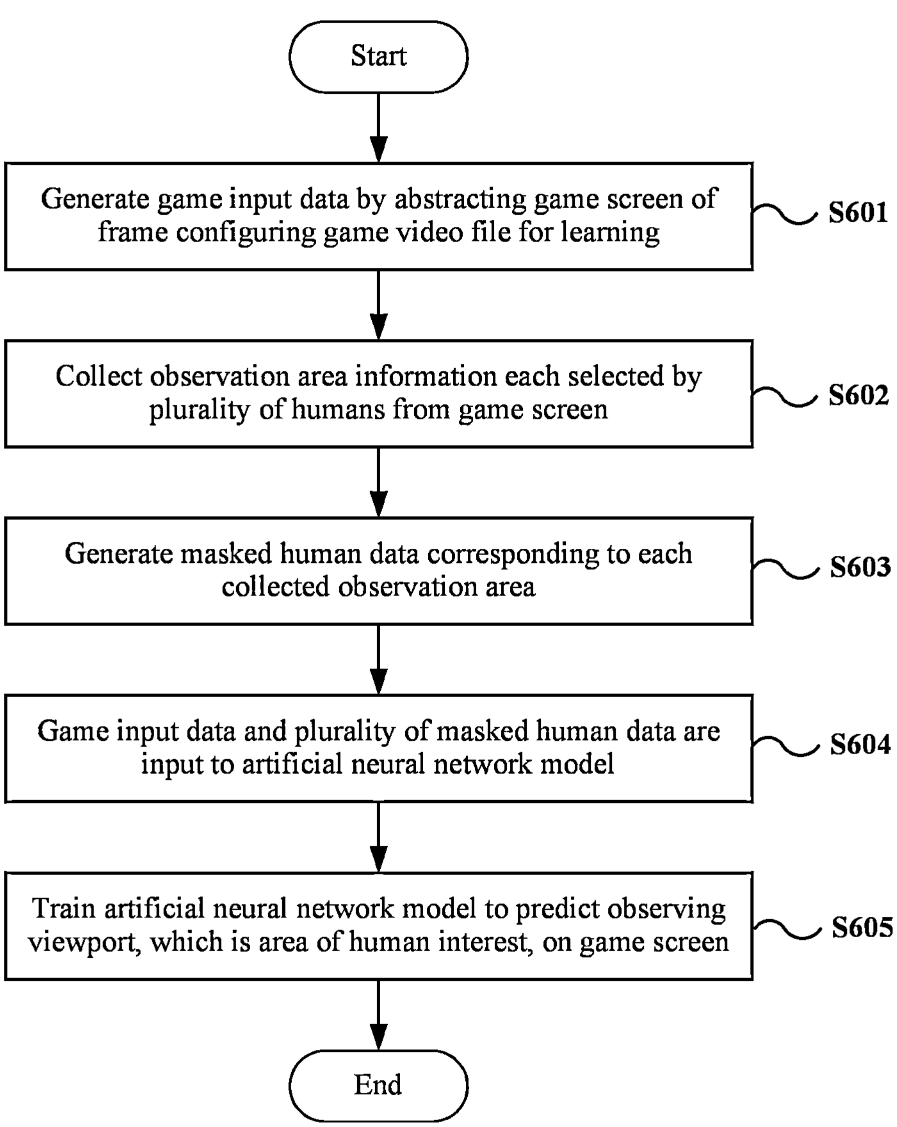
FIG. 6 is an operation flowchart illustrating a learning method for an automatic observing service according to an embodiment of the present disclosure.

FIG. 6 is an operation flowchart illustrating a learning method for an automatic observing service according to an embodiment of the present disclosure. The learning method for an automatic observing service of an embodiment of the present disclosure may be implemented by a processor in a typical computer system.

The computer system generates game input data by abstracting a game screen of a frame configuring a game video file for learning (S601). The computer system groups in-game objects (units and buildings) configuring the game screen according to a type, divides the same into separate channel screens, abstracts the in-game objects for each channel, and outputs the game input data configuring a plurality of channel screens.

The computer system collects observation area information each selected by a plurality of humans from the game screen of the frame configuring the game video file for learning (S602). Then, the computer system generates masked human data corresponding to each collected observation area (S603). The masked human data may include masked data corresponding to the observation area, a class type of the masked data, and coordinate information indicating the location of the masked data.

The game input data in stage S601 and the plurality of masked human data in stage S603 are input to the artificial neural network model (S604).

The computer system trains an artificial neural network model to predict the observing viewport, which is an area of human interest, on the game screen, based on the game input data and a plurality of masked human data (S605). The artificial neural network model 230 may be implemented with MASK R-CNN. The artificial neural network model may learn game input data and a plurality of masked human data to learn observation patterns in areas of human interest on the game screen.

A system for providing an automatic observing service according to an embodiment of the present disclosure may be implemented including an artificial neural network model trained by the learning method for the automatic observing service described above.

All the aforementioned methods and processes may be implemented by a software code module executed by one or more general purpose computers or processors and fully automated. The code module may be stored in an arbitrary type of computer readable storage medium or other computer storage device. Some or all methods may be implemented by a special computer hardware.

It should be understood that any routine description, element or block of the flowcharts described herein and/or illustrated in the accompanying drawings potentially represents a code, a module, a segment, or a portion including one or more executable instructions for implementing a particular logical function or element. Routines and alternative examples are included within the scope of the examples described herein, and may be executed substantially synchronously or in reverse order, with elements or functions deleted or sequenced from what is shown or discussed, depending on the functionality to be understood herein.

It should be understood that many variations and modifications may be made to the aforementioned embodiments, and the element thereof is one of other permissible examples. All the modifications and variations are intended to be included in the scope of the present disclosure and protected by the following claims. The exemplary embodiment of the present disclosure described above may be implemented in the form of a program command which may be executed through various computer components to be recorded in a computer readable recording medium. The computer readable recording medium may include solely a program command, a data file, and a data structure or a combination thereof. The program commands recorded in the computer readable recording medium may be specifically designed or constructed for the present disclosure or known to those skilled in the art of a computer software to be used. Examples of the computer readable recording medium include magnetic media such as a hard disk, a floppy disk, or a magnetic tape, optical recording media such as a CD-ROM or a DVD, magneto-optical media such as a floptical disk, and a hardware device which is specifically configured to store and execute the program command such as a ROM, a RAM, and a flash memory. Examples of the program command include not only a machine language code which is created by a compiler but also a high level language code which may be executed by a computer using an interpreter. The hardware device may operate as one or more software modules in order to perform the operation of the present disclosure and vice versa.

The specified matters and limited exemplary embodiments and drawings such as specific components in the present disclosure have been disclosed for a broader understanding of the present disclosure, but the present disclosure is not limited to the exemplary embodiments, and various modifications, additions, and substitutions are possible from the disclosure by those skilled in the art.

The spirit of the present disclosure is defined by the appended claims rather than by the description preceding them, and all changes and modifications that fall within metes and bounds of the claims, or equivalents of such metes and bounds are therefore intended to be embraced by the range of the spirit of the present disclosure.

DETAILED DESCRIPTION OF MAIN ELEMENTS

200: Game video file for learning
210: Game data processing portion
220: Observing data processing portion
230: Artificial neural network model
500: Game video file for evaluation
510: Game data processing portion
520: Observing data processing portion
530: Trained artificial neural network model
540: Evaluation portion

What is claimed is:

1. A learning system for an automatic observing service, the system comprising:

a memory configured to store one or more instructions; and one or more processors configured to execute the one or more instructions stored in the memory, wherein the one or more instructions, when executed by the one or more processors, cause the system to:

generate game input data based on a game screen of a frame of a game video file for learning, wherein the game input data comprises a plurality of channel screens generated by grouping in-game objects according to types for each frame;

display the game video file for learning to a plurality of viewers;

collect observation area information selected by respective ones of the plurality of viewers from the game screen while the plurality of viewers watch the game video file for learning;

generate a plurality of masked human data based on the observation area information selected by the respective ones of the plurality of viewers; and train an artificial neural network model to predict an observing viewport, which is an area of human interest within the game screen, based on the game input data and the plurality of masked human data, and wherein the artificial neural network model is trained to recognize an observation pattern comprising at least one of locations of in-game objects, movement paths of units, and a number of grouped in-game objects.

2. The system of claim 1, wherein the one or more instructions, when executed by the one or more processors, cause the system to:

group in-game objects in the game screen according to types;

divide the game screen into a plurality of separate channel screens based on the grouped in-game objects; and output game input data, which includes at least one of the separate channel screens, to the artificial neural network model.

3. The system of claim 1, wherein each piece of masked human data comprises masked data corresponding to the observation area, a class type associated with the masked data, and coordinate information indicating a location of the masked data.

4. The system of claim 1, wherein the artificial neural network model is implemented with MASK R-CNN.

5. A system for evaluating a trained artificial neural network model, the system comprising:

a memory configured to store one or more instructions; and one or more processors configured to execute the one or more instructions stored in the memory, wherein the one or more instructions, when executed by the one or more processors, cause the system to:

generate game input data based on a game screen of a frame of a game video file for evaluation, wherein the game input data comprises a plurality of channel screens generated by grouping in-game objects according to types for each frame;

display the game video file for evaluation to a plurality of viewers;

collect observation area information selected by respective ones of the plurality of viewers from the game screen while the plurality of viewers watch the game video file for evaluation;

generate a plurality of masked human data based on the observation area information selected by the respective ones of the plurality of viewers;

predict an observing viewport by applying the game input data to the trained artificial neural network model; and evaluate the trained artificial neural network model based on the predicted observation viewport and the plurality of masked human data, and wherein the trained artificial neural network model is trained to recognize an observation pattern comprising at least one of locations of in-game objects, movement paths of units, and a number of grouped in-game objects.

6. The system of claim 5, wherein the one or more instructions, when executed by the one or more processors, cause the system to:

group in-game objects in the game screen according to types;

divide the game screen into a plurality of separate channel screens based on the grouped in-game objects; and output the game input data, which includes at least one of the separate channel screens, to the trained artificial neural network model.

7. The system of claim 5, wherein the trained artificial neural network model is implemented with MASK R-CNN.

8. The system of claim 5, wherein the one or more instructions, when executed by the one or more processors, cause the system to:

evaluate the trained artificial neural network model based on a ratio between:

an overlapping area between the predicted observation viewport and an observation area identified by the observation area information; and an area of the predicted observation viewport.

9. A learning method for an automatic observing service, performed by a computer system comprising a memory configured to store one or more instructions and one or more processors configured to execute the one or more instructions, the method comprising:

generating, by the one or more processors, game input data based on a game screen of a frame of a game video file for learning, wherein the game input data comprises a plurality of channel screens generated by grouping in-game objects according to types for each frame;

displaying, by the one or more processors, the game video file for learning to a plurality of viewers;

collecting, by the one or more processors, observation area information selected by respective ones of the plurality of viewers from the game screen while the plurality of viewers watch the game video file for learning;

generating, by the one or more processors, a plurality of masked human data based on the observation area information selected by the respective ones of the plurality of viewers; and training, by the one or more processors, an artificial neural network model to predict an observation viewport, which is an area of human interest within the game screen, based on the game input data and the plurality of masked human data, wherein the artificial neural network model is trained to recognize an observation pattern comprising at least one of locations of in-game objects, movement paths of units, and a number of grouped in-game objects.

10. The method of claim 9, wherein generating, by the one or more processors, game input data based on a game screen of a frame of a game video file for learning comprises:

grouping, by the one or more processors, in-game objects in the game screen according to types;

dividing, by the one or more processors, the game screen into a plurality of separate channel screens based on the grouped in-game objects; and outputting, by the one or more processors, game input data comprising at least one of the separate channel screens to the artificial neural network model.

11. The method of claim 9, wherein each piece of masked human data comprises masked data corresponding to the observation area, a class type associated with the masked data, and coordinate information indicating a location of the masked data.

12. The method of claim 9, wherein the artificial neural network model is implemented with MASK R-CNN.

* * * * *